Patented Dec. 1, 1953

2,661,380

UNITED STATES PATENT OFFICE 2,661,380

OXIDATIVE DEHYDROGENATION OF CYCLIC HYDROCARBONS

Bernard Orkin, Philadelphia, Pa., assignor to Socony-Vacuum Oil Company, Incorporated, a corporation of New York No Drawing. Application February 20, 1951, Serial No. 211,975

16 Claims. (Cl. 260—666)

The present invention relates to the dehydrogenation of cyclic hydrocarbons and, more particularly, to the oxidative dehydrogenation of cyclic hydrocarbons to produce a substantially non-oxygenated product.

Moureu, Dufraisse and Chaux, in Compt. rend. vol. 184, 413 (1927) disclosed that decalin autoxidizes at room temperature with the formation of peroxides. Kroger and Struber in Naturwiss, vol. 32, 229 (1944) have described the oxidation of decalin with elementary oxygen at 120°–150° C. to yield such products as oxides of carbon, hydrogen, water, formic acid, naphthalene, phthalic acid and, as a preponderant product, a resinous material. Shimose, in Sci. Papers Inst. Phys. Chem. Research (Tokyo) vol. 15, 251 (1931) has shown that when decalin vapor and air are passed over ammonium vanadate-molybdate catalyst at 490°–510° C. phthalic anhydride is obtained. Chowdhury, in J. Ind. Chem. Soc. vol. 14, 638 (1937) has disclosed that vapor phase oxidation of decalin with a large excess of air over tin vanadate on asbestos yields phthalic anhydride, maleic anhydride, succinic anhydride, formaldehyde and oxides of carbon. It has also been shown by Nametkin and Rozenberg in Chem. Abs. vol. 39, 3902 (1945) that decalin has been oxidized to naphthalene and a number of other substances at 575° C.

According to Hartmann and Seiberth, Helv. Chim. Acta, vol. 15, 1390 (1932), tetralin has been oxidized to the hydroperoxide while Hock and Susemihl, Berichte, vol. 66, 61 (1933) report that tetralin has been oxidized to tetralone and Chernozhukov reports in J. Applied Chem. (USSR) vol. 8, 251 (1935) that tetralin is oxidized to acids and phenols. Maxted has reported in Trans. J. Soc. Chem. Ind. vol. 47, 101 (1928) that tetralin with oxygen in the vapor phase at 280° C. over a tin vanadate catalyst gives a 50 per cent yield of phthalic anhydride. Green has reported that a 67 per cent yield of phthalic anhydride can be obtained by the oxidation of tetralin over vanadium oxide, on pumice at 340° C. and with vanadium oxide on silica gel at 400°–475° C. Shreve and Welborn report that a better than 70 per cent yield of phthalic anhydride has been obtained. (Ind. Eng. Chem. vol. 35, 279 (1943)). The formation of trace amounts of benzene and naphthalene has been reported by Nametkin and Rozenberg (ibid. supra).

Senderens, Ann. Chim. (9) 13, 283; Wagner U. S. Patent 2,386,372; Berl, Heise and Winnacker, Z. Physik. Chem. (A) 139, 457; Chowdhury and Saboor, J. Ind. Chem. Soc. 14, 638 (1937); Rust, Raley and Vaughn, U. S. Patent 2,421,392; Milas and Walsh, J. Am. Chem. Soc. 61, 633 (1939); Shmidl, U. S. Patent 2,474,334; and Hamvlet and McAlevy, U. S. Patent No. 2,439,513; report the oxidation of cyclohexane with air to maleic acid. It is to be noted that Milas and Walsh also report that a small quantity of benzene is obtained in addition to the maleic acid. The catalysts employed are respectively, silver, silver oxide, iron carbonyl, tin vanadate, hydrogen bromide, vanadium oxide on pumice, vanadium oxide on silica gel, and cobalt naphthenate.

Methylcyclohexane has been oxidized to the corresponding ketone by passing a mixture of the cycloparaffin with air over a silver oxide catalyst at 400°–500° C. (Wagner, U. S. Patent 2,386,372).

Cyclohexane has been oxidized to maleic acid over vanadium oxide [Milas and Walsh, J. Am. Chem. Soc. 61, 633 (1939)]. The use of iron and peroxide catalysts in the oxidation of cyclohexane has been suggested by Berl, Heise and Winnacker (ibid. supra), and in British Patent 534,525 respectively.

Partial oxidation of hydrocarbon oils such as kerosene or gasoline has been accomplished in elongated tubes in the absence of catalyst as disclosed in U. S. Patents Nos. 1,767,291 and 1,808,168. In the Voorhees U. S. Patent No. 2,351,793 the oxidation of oil in the presence of finely divided siliceous catalysts at temperatures above 750° F. is described; the catalyst being present to the extent of about 25 per cent to about 600 per cent by weight of the hydrocarbon oil.

Oxidation of decalin and tetralin to naphthalene in low yield in a mixture of oxygenated hydrocarbons has been reported to take place in the absence of a catalyst at 575° C.

Vasilev and Glushner, Chem. Abs. 43, 8124i (1949) are said to have experimented with oxidative reforming but obtain only low yields.

Thus, it is apparent that prior art attempts to oxidatively dehydrogenate decalin, tetralin, cyclohexane and in general cyclic hydrocarbons has resulted in low yields of the corresponding less saturated hydrocarbon in admixture with a predominating yield of oxygenated products.

It has now been discovered that decalin, tetralin, cyclohexane, methyl cyclohexane and in general cyclic hydrocarbons having a nuclear hydrogen to carbon ratio greater than 1:1 can be oxidatively dehydrogenated to the corresponding less saturated hydrocarbon, i. e., having a nuclear hydrogen carbon ratio not greater than 1:1 employing silica gel, or tellurium oxide on a support as a catalyst.

When substantially pure hydrocarbons serve as the feed material in the present method, i. e., decalin, tetralin, cyclohexane, methylcyclohexane, oxidative dehydrogenation takes place to yield a substantially non-oxygenated product. However, when a mixture of cyclic hydrocarbons and non-cyclic hydrocarbons such as a petroleum naphtha is the feed material similar reactions take place but, because of the initial presence of compounds other than cycloparaffins, oxygen-containing compounds also are formed.

Oxidative dehydrogenation of decalin, tetralin, cyclohexane, methylcyclohexane was obtained by passing a mixture of the hydrocarbon mixed with 100 per cent to 400 per cent excess of that theoretically required of oxygen or air or in general free-oxygen containing gas over the catalyst at temperatures of about 550°–950° F. with a preferred temperature of about 740°–760° F. The reactor was kept immersed in a constant temperature salt bath and the hydrocarbon and oxygen or air were introduced in metered amounts through separate preheater coils at the bottom of the reactor. Effluent was collected in a suitable trap and analyzed. Although all of the runs reported herein were carried out at atmospheric, subatmospheric pressures can be used.

The catalyst can be silica gel per se or in conjunction with a tellurium oxide catalyst. A tellurium oxide catalyst can also be supported by an inert support such as tabular alumina, asbestos or the like.

The runs reported herein were conducted in the space velocity range of about 0.1 to about 0.6. The lower space velocity rates are more suitable for the oxidative dehydrogenation of substantially pure hydrocarbons where the oxygen concentration is high. When the oxygen concentration is low and/or little heat is developed, a space velocity of about 3.0 is satisfactory. Thus, liquid hourly space velocities (LHSV) of about 0.1 to about 3.5 to 4 are suitable.

Liquid hourly space velocity is defined as the ratio of the volume of liquid charge passed per hour over a unit volume of catalyst, for example, c. c. liquid charge/c. c. catalyst/hr.

It is of interest to note that in co-pending application for United States Letters Patent Serial No. 139,529, filed January 19, 1950, the oxidation of activated methyl or methylene groups to carbonyl groups employing a catalyst comprising at least one oxide of tellurium, is disclosed. Consequently, it is surprising to discover that a catalyst comprising a tellurium oxide is useful for oxidatively dehydrogenating cyclic hydrocarbons without the formation of substantial amounts of oxygenated products.

The oxidative dehydrogenation of cyclic hydrocarbons such as decalin, tetralin, cyclohexane, methyl cyclohexane to naphthalene, cyclohexene and benzene, and methyl cyclohexene respectively, is achieved by passing preheated hydrocarbon and oxidizing gas containing free oxygen through a reactor in contact with a catalyst, or a catalyst on an inert support as hereinafter indicated, and separating the dehydrogenated hydrocarbon from unreacted hydrocarbon and other products of the reaction. With such exceptions as are noted hereinafter the reactor was a glass reactor. In the indicated instances the glass reactor was replaced by a metal reactor fabricated of stainless steel #347 said to contain nickel= 8–12 per cent; chromium=17–20 per cent; carbon=0.10 per cent max.; columbium=1.0 per cent max.; iron=67–75 per cent.

It is to be noted that when tetralin vapor and oxygen are passed over tellurium oxide on alumina or on silica gel, i. e., an inactive and an active support respectively, the hydrocarbon was dehydrogenated to naphthalene. The reaction is essentially an oxidation since only negligible conversions i. e., 1 per cent to 3 per cent, were obtained in the absence of oxygen.

Silica gel was found to be a catalyst for the oxidative dehydrogenation of the substantially pure hydrocarbons as well as for commercial naphthas. Commercial naphthas when subjected to oxidative dehydrogenation using silica gel alone showed definite improvement in octane number as well as an increase in bromine number.

The data obtained in a series of runs is tabulated in the following tables which are believed to be self-explanatory for those skilled in the art.

TABLE I

*Effect of metallic tellurium and alumina on the dehydrogenation of tetralin to naphthalene in the absence of oxygen*

| Run No. | Temperature, ° F. | | Nitrogen, moles/hr. | Tetralin, moles/hr. | Time, hours | Percent conversion[a] | Catalyst |
|---|---|---|---|---|---|---|---|
| | Bath | Reactor | | | | | |
| 1 | 740 | 710 | None | 0.039 | 3.5 | 3 | Tellurium metal on tab. alumina.[b] |
| 2 | 800 | 760 | 0.122 | .042 | 3.5 | 2 | Tellurium metal on tab. alumina. |
| 3 | 740 | 710 | None | .045 | 3.5 | 1 | Tellurium metal (activated).[c] |
| 4 | 774 | 774 | None | .038 | 1.3 | 2 | Tab. alumina. |

[a] Percent conversion—mol percent conversion of tetralin to naphthalene in 1 pass.
[b] Catalyst (6.3 g. tellurium oxide TeO₂ on 100 cc. alumina) was reduced with hydrogen.
[c] Tellurium metal (6-10 mesh) was oxidized with oxygen and reduced with hydrogen (several cycles).

It will be noted that in the absence of oxygen the conversion of tetralin to naphthalene was negligible.

TABLE II

*Effect of inert support on dehydrogenation of tetralin to naphthalene in the presence of oxygen*

| Run No. | Temperature, °F. Bath | Temperature, °F. Reactor | Oxygen, moles/hr. | Tetralin, moles/hr. | MR a | Time, hours | Percent conversion b | Catalyst |
|---|---|---|---|---|---|---|---|---|
| 5 | 730 | 760 | 0.110 | 0.043 | 2.3 | 3.3 | 15 | Quartz. |
| 6 | 778 | 770 | .107 | .034 | 3.2 | 1.3 | 20 | Tab alumina.c |
| 7 | 765 | 780 | .117 | .038 | 3.1 | 1.3 | 29 | Tab alumina.c |
| 8 | 770 | 775 | .115 | .028 | 4.1 | 3.4 | 82 | Silica gel.c |
| 9 | 775 | 775 | d.104 | .028 | 3.8 | 3.4 | 34 | Do.c | a MR—mols oxygen per mol of tetralin.
b Percent conversion—mol percent conversion of tetralin to naphthalene in 1 pass.
c Metal reactor used in this run.
d Air substituted for oxygen.

It will be observed that substitution of air for oxygen reduces the conversion in one pass when using silica gel as the catalyst from 82 per cent to 34 per cent. It will also be noted that such relatively inert supports as quartz and tabular alumina produce some conversion.

TABLE III

*Effect of tellurium dioxide on alumina catalyst on dehydrogenation of tetralin to naphthalene in the presence of oxygen*

| Run No. | Temperature, °F. Bath | Temperature, °F. Reactor | Oxygen, moles/hr. | Tetralin, moles/hr. | MR a | Time, hours | Percent conversion b | Catalyst |
|---|---|---|---|---|---|---|---|---|
| 10 | 720 | 755 | 0.117 | 0.039 | 3.0 | 3.5 | 49 | (e) |
| 11 | 765 | 775 | .100 | .049 | 2.0 | 1.9 | 31 | (e) |
| 12 | 760 | 770 | .122 | .060 | 2.0 | 1.3 | 31 | (f) |
| 13 | 720 | 725 | .090 | .049 | 1.8 | 1.3 | 30 | (g) |
| 14 | 730 | 740 | .110 | .032 | 3.4 | 1.5 | 64 | (g d) |
| 15 | 770 | 775 | c.132 | .045 | 2.9 | 2.0 | <1 | (e) |
| 16 | 765 | 770 | c.132 | .066 | 2.0 | 2.5 | <1 | (e) |
| 17 | 780 | 790 | c.035 | .072 | 0.4 | 2.5 | 4 | (e) |
| 18 | 780 | 870 | .122 | .068 | 1.8 | 2.5 | 33 | (e) | a MR—mols oxygen per mol of tetralin.
b Percent conversion—mol percent conversion of tetralin to naphthalene in 1 pass.
c Air substituted for oxygen.
d Metal reactor used in this run.
e 6.3 g. tellurium oxide per 100 cc. alumina.
f 1.5 g. tellurium oxide per 100 cc. alumina.
g 10.0 g. tellurium oxide per 100 cc. alumina.

It will be observed that 1.5 grams of tellurium oxide per 100 cc. of support has little or no catalytic effect. On the other hand, 6.3 grams tellurium oxide per 100 cc. of support increased the conversion by about 58 per cent. Accordingly, it is preferred to have at least about 2 grams of tellurium oxide per 100 cc. of support.

TABLE IV

*Effect of tellurium dioxide on silica gel catalyst on dehydrogenation of tetralin to naphthalene in the presence of oxygen*

| Run No. | Temperature, °F. Bath | Temperature, °F. Reactor | Oxygen, moles/hr. | Tetralin, moles/hr. | MR c | Time, hours | Percent conversion d | Catalyst |
|---|---|---|---|---|---|---|---|---|
| 19 | 660 | 700 | 0.115 | 0.063 | 1.7 | 1.5 | 31 | (a) |
| 20 | 660 | 700 | .090 | .038 | 2.4 | 1.3 | 36 | (b) |
| 21 | 580 | 620 | e.087 | .038 | 2.3 | 1.3 | 22 | (b) |
| 22 | 745 | 745 | e.092 | .030 | 3.1 | 2.6 | 59 | (f b) |
| 23 | 600 | 600 | e.094 | .030 | 3.1 | 1.6 | 20 | (f b) |
| 24 | 745 | 750 | .110 | .036 | 3.1 | 2.0 | 54 | (f b) | a 9.3 g. tellurium oxide per 100 cc. (muffled) silica gel.
b 7.0 g. tellurium oxide per 100 cc. silica gel.
c MR—mols oxygen per mol of tetralin.
d Percent conversion—mol percent conversion of tetralin to naphthalene in 1 pass.
e Air substituted for oxygen.
f Metal reactor used in this run.

Comparison of the conversions achieved in Runs Nos. 22 and 23 indicates the effect of reactor temperature upon the yield and establishes that preferred reactor temperatures are of the order of 740°–760° F.

TABLE V

*Dehydrogenation of decalin to naphthalene in the presence of oxygen*

| Run No. | Temperature, °F. Bath | Temperature, °F. Reactor | Oxygen, moles/hr. | Decalin e, moles/hr. | MR c | Time, hours | Percent conversion f | Catalyst |
|---|---|---|---|---|---|---|---|---|
| 25 | 720 | 735 | d 0.099 | 0.030(C) | 3.3 | 2.0 | <1 | (a) |
| 26 | 715 | 715 | .042 | .035(C) | 1.2 | 2.0 | <1 | (a) |
| 27 | 745 | 765 | d.092 | .024(C) | 3.8 | 1.4 | 17 | (b) |
| 28 | 645 | 670 | d.093 | .024(C) | 3.9 | 1.2 | 9 | (b) |
| 29 | 570 | 590 | d.097 | .025(C) | 3.9 | 1.5 | 3 | (b) |
| 30 | 745 | 770 | d.094 | .030(T) | 3.1 | 1.5 | 18 | (b) |
| 31 | 635 | 670 | d.095 | .030(T) | 3.2 | 1.4 | 6 | (b) |
| 32 | 760 | 787 | d.093 | .024(C) | 3.9 | 2.0 | 22 | (i) | a 6.3 g. tellurium oxide per 100 cc. alumina.
b 7.0 g. tellurium oxide per 100 cc. silica gel.
c MR—moles of oxygen per mole of decalin.
d Air substituted for oxygen.
e C—cis-decalin; T—trans-decalin.
f Percent conversion—mole percent conversion of decalin to naphthalene in 1 pass.
i Silica gel.

It will be noted that while conversion of decalin to naphthalene begins at 590° F. appreciable conversions are achieved at about 760°–790° F.

TABLE VI

*Dehydrogenation of cyclohexane to cyclohexene in the presence of oxygen*

| Run No. | Temperature, °F. Bath | Temperature, °F. Reactor | Oxygen, moles/hr. | Cyclohexane, moles/hr. | MR f | Time, hours | Percent conversion h | Catalyst |
|---|---|---|---|---|---|---|---|---|
| 33 | 465 | 468 | 0.122 | 0.071 | 1.7 | 2.0 | 0 | (a) |
| 34 | 650 | 655 | g.043 | .110 | .36 | 3.0 | 2 | (a) |
| 35 | 645 | 645 | .031 | .064 | .48 | 2.2 | 4 | (a) |
| 36 | 750 | 750 | .033 | .073 | .45 | 2.0 | 5 | (a) |
| 37 | 720 | 730 | g.102 | .063 | 1.6 | 3.0 | 7 | (a) |
| 38 | 720 | 713 | .196 | .071 | 2.8 | 2.3 | d 6 | (b i) |
| 39 | 710 | 745 | g.105 | .071 | 1.4 | 14.1 | e 1 | (c) |
| 40 | 745 | 770 | g.104 | .048 | 2.2 | 1.3 | 1 | (i) |
| 41 | 630 | 638 | g.103 | .059 | 1.7 | 1.8 | 1 | (i) |
| 42 | 500 | 500 | g.103 | .061 | 1.7 | 1.8 | <1 | (i) | a 6.3 g. tellurium oxide per 100 cc. alumina.
b 10.0 g. tellurium oxide per 100 cc. alumina.
c 7.0 g. tellurium oxide per 100 cc. silica gel.
d In addition, 4 percent conversion to benzene.
e In addition, 3 percent conversion to benzene.
f MR—moles of oxygen per mole of cyclohexane.
g Air substituted for oxygen.
h Percent conversion—mole percent conversion of cyclohexane to cyclohexene in 1 pass.
i Metal reactor used in this experiment.
j Silica gel.

TABLE VII
*Dehydrogenation of methylcyclohexane to methylcyclohexene in the presence of oxygen*

| Run No. | Temperature, °F. Bath | Temperature, °F. Reactor | Oxygen, moles/hr. | Methylcyclohexane G./hr. | Methylcyclohexane Moles/hr. | MR[h] | Time, hours | Percent conversion[j] | Catalyst |
|---|---|---|---|---|---|---|---|---|---|
| 43 | 485 | 485 | 0.105 | 6.3 | 0.064 | 1.6 | 2.7 | 0 | (a) |
| 44 | 645 | 645 | .067 | 7.6 | .077 | .87 | 2.5 | 7 | (a) |
| 45 | 760 | 760 | .031 | 5.5 | .056 | .54 | 2.0 | 16 | (a) |
| 46 | 700 | 690 | .171 | 8.8 | .090 | 1.9 | 2.3 | 14 | (b, k) |
| 47 | 700 | 690 | .092 | 9.4 | .096 | .96 | 1.6 | 18 | (b, k) |
| 48 | 700 | 690 | .044 | 9.4 | .096 | .46 | 1.3 | 13 | (b, k) |
| 49 | 750 | 785 | i.104 | 7.1 | .072 | 1.4 | 1.3 | d 3 | (c) |
| 50 | 650 | 685 | i.104 | 6.4 | .065 | 1.6 | 1.5 | e 4 | (c) |
| 51 | 750 | 782 | i.101 | 7.6 | .078 | 1.3 | 1.3 | f 4 | (l) |
| 52 | 625 | 638 | i.101 | 5.8 | .059 | 1.7 | 1.4 | g 3 | (l) |
| 53 | 510 | 510 | i.101 | 5.3 | .054 | 1.9 | 1.0 | 0 | (l) | a 6.3 g. TeO₃ per 100 cc. alumina.
b 10.0 g. TeO₃ per 100 cc. alumina.
c 7.0 g. TeO₃ per 100 cc. silica gel.
d In addition, 8% conversion to toluene.
e In addition, 4% conversion to toluene.
f In addition, 4% conversion to toluene.
g In addition, 2% conversion to toluene.
h MR—moles of oxygen per mole of methylcyclohexane.
i Air substituted for oxygen.
j Percent conversion—mole percent conversion of methylcyclohexane to methylcyclohexene.
k Metal reactor used in this experiment.
l Silica gel.

TABLE VIII
*Dehydrogenation of cyclohexene to benzene in the presence of oxygen*

| Run No. | Temperature, °F. Bath | Temperature, °F. Reactor | Oxygen, moles/hr. | Cyclohexene G./hr. | Cyclohexene Moles/hr. | MR[a] | Time, hrs. | Percent conversion[c] | Catalyst |
|---|---|---|---|---|---|---|---|---|---|
| 54 | 760 | 810 | b 0.103 | 8.0 | 0.098 | 1.1 | 1.3 | 22 | Silica gel. |
| 55 | 635 | 670 | b .104 | 7.6 | .093 | 1.1 | 1.5 | 9 | Do. |
| 56 | 503 | 515 | b .104 | 8.4 | .102 | 1.0 | 1.1 | 1 | Do. | a MR—moles of oxygen per mole of cyclohexene.
b Air substituted for oxygen.
c Percent conversion—mole percent conversion of cyclohexene to benzene.

From the data presented in Table VIII it is manifest that for the oxidative dehydrogenation of cyclohexene to benzene the preferred temperature is in excess of 810° F., say from about 810° F. to about 850° F.

It is of interest to note that when oxygen is replaced by nitrogen there is no dehydrogenation as measured by the increase in bromine number. Thus, a naphtha which in the untreated state had a bromine number of 3.8 when

TABLE IX
*Dehydrogenation of naphthas in the presence of oxygen*

| Run No. | Charge stock* | Temp., °F. | Charge LSV[d] | Oxygen, cc./hr.[e] | Catalyst | Weight percent recovery[f] | API gravity | Bromine No. | Research octane number, clear |
|---|---|---|---|---|---|---|---|---|---|
|  | (a) |  |  |  |  |  | 65.1 | 0.6 | 61 |
| 57 | (a) | 740 | 0.71 | 1,830 | Silica gel | 93 | 63.3 | 18.3 | 68.7 |
| 58 | (a) | 745 | 0.77 | 1,260 | do | 94 | 63.9 | 10.5 | 65.0 |
|  | (b) |  |  |  |  |  | 46.8 | 3.8 | 55 |
| 59 | (b) | 750 | 0.63 | 1,770 | Silica gel | 96 | 44.9 | 18.7 | 69.0 |
| 60 | (b) | 730 | 0.59 | 1,950 | do | 90 | 44.4 | 16.1 |  |
| 61 | (g) | 755 | 0.48 | 1,920 | do | 96 | 41.4 | 21.5 | 73.0 |
| 62 | (b) | 805 | 0.50 | 1,970 | do | 96 | 45.3 | 18.7 | 68.0 |
| 63 | (b) | 865 | 0.44 | 1,970 | do | 95 | 47.0 | 19.2 | 67.0 |
| 64 | (b) | 765 | 0.59 | 1,950 | Silica gel+8.4% chromia | 93 | 44.8 | 15.1 | 65.0 |
| 65 | (b) | 855 | 0.40 | 1,950 | do | 80 | 45.4 | 12.6 | 64.0 |
| 66 | (b) | 750 | 0.48 | 9,180N | Silica gel | 94 | 45.8 | 1.2 | 54.5 |
| 67 | (b) | 750 | 0.48 | 9,180A | do | 91 | 45.3 | 8.0 | 60.0 |
| 68 | (h) | 750 | 0.48 | 9,000A | do | 95 |  |  | 67.0 |
| 69 | (k) | 750 | 0.48 | 9,000A | do | 93 | 43.1 | 17.4 | 44.4 |
|  | (c) |  |  |  |  |  | 55.1 | 0.9 |  |
| 70 |  | 855 | 0.46 | 1,980 | Silica gel+8.4% chromia | 94 | 54.6 | 9.8 | 53.5 |
| 71 |  | 745 | 0.64 | 1,980 | do | 96 | 53.7 | 15.3 | 56.5 |
| 72 |  | 750 | 0.63 | 1,950 | Silica gel | 95 | 53.6 | 13.2 | 56.0 |
| 73 |  | 845 | 0.66 | 1,920 | do | 95 | 53.7 | 10.0 | 54.0 |
| 74 |  | 750 | 0.63 | 1,980 | do | 95 |  |  |  |
| 75 | (l) | 750 | 0.55 | 1,920 | do | 95 | 52.3 | 16.7 | 60.0 |
| 76 | (m) | 755 | 0.62 | 1,950 | do | 92 | 50.7 | 24.4 | 68.0 |
| 77 |  | 750 | 0.63 | 9,000N | do | 98 | 55.1 | 0.6 | 45.0 |

*Naphthas containing cycloparaffins particularly cyclohexane and methylcyclohexane.
a Oklahoma City light naphtha boiling range 151° F.-244° F.
b General Petroleum straight run heavy naphtha boiling range 156° F.-406° F.
c Agha Jari full boiling range naphtha boiling range 181° F.-388° F.
d LSV—liquid space velocity—volume of liquid naphtha per unit volume of catalyst per hour.
e N—nitrogen substituted for oxygen. A—air substituted for oxygen.
f Recovery of total liquid product from water-cooled and Dry Ice-cooled traps.
g (Describe stock 730 as above.)
h (Describe stock 745 as above.)
k (Describe stock 746 as above.)
l (Describe stock 741 as above.)
m (Describe stock 742 as above.)

passed in admixture with nitrogen over silica gel actually had a lower bromine number after treatment than before. (See Table IX, Runs No. 66.)

I claim:

1. A method of oxidative dehydrogenation of carbocyclic hydrocarbons which comprises mixing a first carbocyclic hydrocarbon in which the number of hydrogen atoms directly attached to nuclear carbon atoms is greater than the number of unsubstituted nuclear carbon atoms with a gas containing free oxygen, the amount of oxygen in the resultant mixture being at least about 100% in excess of the theoretical amount required to produce by oxidation a second carbocyclic hydrocarbon having fewer hydrogen atoms directly attached to nuclear carbon atoms than said first carbocyclic hydrocarbon, contacting said mixture with a catalyst selected from the group consisting of silica gel, tellurium oxide, and silica gel and chromia, at a temperature of about 550° to about 950° F., and separating a carbocyclic hydrocarbon in which the number of hydrogen atoms directly attached to nuclear carbon atoms is less than said first carbocyclic hydrocarbon.

2. A method of oxidative dehydrogenation of tetralin which comprises mixing tetralin with a gas containing free oxygen in amount sufficient to provide 100% to 400% oxygen in excess of that theoretically required to dehydrogenate said tetralin to naphthalene by oxidation, contacting the resultant mixture with a catalyst selected from the group consisting of silica gel, tellurium oxide, and silica gel and chromia at temperatures of about 600° F. to about 775° F. and separating naphthalene.

3. The method of oxidative dehydrogenating tetralin to naphthalene as described and set forth in claim 2 wherein the catalyst is tellurium oxide.

4. A method of oxidative dehydrogenation of decalin which comprises mixing decalin with a gas containing free oxygen in amount sufficient to provide 100% to 400% oxygen in excess of that theoretically required to dehydrogenate said decalin to naphthalene by oxidation, contacting the resultant mixture with a catalyst selected from the group silica gel, tellurium oxide, and silica gel and chromia at temperatures of about 590° F. to about 790° F., and separating naphthalene.

5. The method of oxidative dehydrogenating decalin to naphthalene as set forth and described in claim 4 wherein the catalyst is tellurium oxide on silica gel.

6. A method of oxidative dehydrogenation of cyclohexane which comprises mixing cyclohexane with a gas containing free oxygen in amount sufficient to provide 100% to 400% oxygen in excess of that theoretically required to dehydrogenate cyclohexane to cyclohexene by oxidation, contacting the resultant mixture with a catalyst selected from the group consisting of silica gel, tellurium oxide, and silica gel and chromia at a temperature of about 700° to about 750° F., and separating cyclohexene.

7. The method of oxidative dehydrogenating cyclohexane to cyclohexene as described and set forth in claim 6 wherein the catalyst is tellurium oxide.

8. A method of oxidative dehydrogenation of methylcyclohexane which comprises mixing methylcyclohexane with a gas containing free oxygen in amount sufficient to provide 100% to 400% oxygen in excess of that theoretically required to dehydrogenate methylcyclohexane to methylcyclohexene by oxidation, contacting the resultant mixture with a catalyst selected from the group consisting of silica gel, tellurium oxide, and silica gel and chromia at a temperature of about 635° to about 760° F., and separating methylcyclohexene.

9. The method of oxidative dehydrogenating methylcyclohexane to methylcyclohexene as described and set forth in claim 8 wherein the catalyst is tellurium oxide.

10. A method of oxidative dehydrogenation of cycloparaffins to the corresponding aromatic hydrocarbon of the benzene series which comprises mixing a cycloparaffin having a single six membered ring and not more than one methyl substituent with a gas containing free oxygen in amount sufficient to provide 100% to 400% oxygen in excess of that theoretically required to dehydrogenate said cycloparaffin to a cycloolefin by oxidation, contacting the resulting mixture with tellurium oxide at a temperature of about 635° to about 760° F., and separating an aromatic hydrocarbon of the benzene series.

11. A method of oxidative dehydrogenation of cyclohexene to benzene which comprises mixing cyclohexene with a gas containing free oxygen in amount sufficient to provide 100% to 400% oxygen in excess of that required to dehydrogenate said cyclohexene to benzene by oxidation, contacting the resulting mixture with tellurium oxide at a temperature of about 515° to about 810° F., and separating benzene.

12. A method of raising the octane number of a petroleum naphtha which comprises mixing a petroleum naphtha with a gas containing free oxygen in amount sufficient to provide 100% to 400% oxygen in excess of that theoretically required, contacting the resultant mixture with a silica gel catalyst at a temperature of about 550° to about 950° F., and separating a naphtha having an improved octane number and an increased bromine number.

13. A method of raising the octane number of a petroleum naphtha which comprises mixing a petroleum naphtha with gas containing free oxygen in amount sufficient to provide 100% to 400% oxygen in excess of that theoretically required, contacting the resultant mixture with a silica-chromia catalyst at temperatures of about 730° F. to about 865° F., and separating a naphtha having an improved octane number and increased bromine number.

14. The method set forth and described in claim 13 wherein the liquid space velocity is less than 1.

15. A method of oxidative dehydrogenation of carbocyclic hydrocarbons which comprises mixing a first carbocyclic hydrocarbon in which the number of hydrogen atoms directly attached to nuclear carbon atoms is greater than the number of unsubstituted nuclear carbon atoms with a gas containing free oxygen, the amount of oxygen in the resultant mixture being about 100% to about 400% in excess of that theoretically required to produce by oxidation from the first carbocyclic hydrocarbon a second carbocyclic hydrocarbon having fewer hydrogen atoms attached to nuclear carbon atoms than said first carbocyclic hydrocarbon, contacting said mixture with a catalyst selected from the group consisting of silica gel, tellurium oxide and silica gel and chromia at a temperature of about 550° to about 950° F. and separating a carbocyclic hydrocarbon in which the number of hydrogen atoms directly attached to nuclear carbon atoms is less than said first carbocyclic hydrocarbon.

16. A method of oxidative dehydrogenation of carbocyclic hydrocarbons which comprises mixing a first carbocyclic hydrocarbon in which the number of hydrogen atoms directly attached to nuclear carbon atoms is greater than the number of unsaturated nuclear carbon atoms with a gas containing free oxygen, the amount of oxygen in the resultant mixture being in excess of the theoretical amount required to produce by oxidation a second carbocyclic hydrocarbon having fewer hydrogen atoms directly attached to nuclear carbon atoms than said first carbocyclic hydrocarcon, contacting said mixture with tellurium oxide in the presence of a nickel-chromia-iron alloy containing 8–12% nickel, 17–20% chromium, 67–75% iron, 1.0% (maximum) molybdenum and 0.10% (maximum) carbon, at a temperature of about 550° to about 950° F., and separating a carbocyclic hydrocarbon in which the number of hydrogen atoms directly attached to nuclear carbon atoms is less than said first carbocyclic hydrocarbon.

BERNARD ORKIN.

References Cited in the file of this patent

UNITED STATES PATENTS

| Number | Name | Date |
|---|---|---|
| 1,214,204 | Mann et al. | Jan. 30, 1917 |
| 1,984,519 | Chappell | Dec. 18, 1934 |
| 2,077,994 | Ellis | Apr. 20, 1937 |
| 2,143,380 | Klein et al. | Jan. 10, 1939 |
| 2,347,805 | Bell | May 2, 1944 |
| 2,350,834 | Sensel et al. | June 6, 1944 |
| 2,351,793 | Voorhees et al. | June 20, 1944 |
| 2,378,209 | Fuller et al. | June 21, 1945 |

OTHER REFERENCES

Nametkin et al., Chem. Abstracts, vol. 39, page 3902 (1945).